United States Patent
Kariya (10) Patent No.: US 7,866,938 B2
(45) Date of Patent: Jan. 11, 2011

(54) VERTICAL AXIS WINDMILL WITH GUIDING DEVICES

(75) Inventor: Vinod Kumar Chamanlal Kariya, Gujarat (IN)

(73) Assignee: Anandbhai Chunilal Vora, Gujarat (IN)

( * ) Notice: Subject to any disclaimer, the term of this patent is extended or adjusted under 35 U.S.C. 154(b) by 672 days.

(21) Appl. No.: 11/813,966

(22) PCT Filed: Feb. 27, 2006

(86) PCT No.: PCT/IN2006/000064

§ 371 (c)(1),
(2), (4) Date: Jul. 13, 2007

(87) PCT Pub. No.: WO2007/010551

PCT Pub. Date: Jan. 25, 2007

(65) Prior Publication Data

US 2008/0131281 A1    Jun. 5, 2008

(30) Foreign Application Priority Data

Mar. 22, 2005    (IN) .................................. 326/2005

(51) Int. Cl.
*F03B 3/04*    (2006.01)
(52) U.S. Cl. ................... 415/4.4; 415/183; 415/224; 416/197 A; 416/243; 416/244 R
(58) Field of Classification Search ................ 415/4.4, 415/183, 224, 907; 416/197 A, 243, 244 R; 290/44, 55
See application file for complete search history.

(56) References Cited

U.S. PATENT DOCUMENTS 1,595,578 A    8/1926    Sovereign
4,047,834 A    9/1977    Magoveny et al.
4,269,563 A    5/1981    Sharak et al.

(Continued)

FOREIGN PATENT DOCUMENTS

FR    2432102 A1    2/1980

(Continued)

OTHER PUBLICATIONS

International Search Report for PCT/IN2006/000064.

*Primary Examiner*—Ninh H Nguyen
(74) *Attorney, Agent, or Firm*—Caesar, Rivise, Bernstein, Cohen & Pokotilow, Ltd.

(57) ABSTRACT

The instant invention deals with the solution to technical flaws of existing vertical axis windmills in which the wind strikes simultaneously on inward and outward facing sides of rotor blades which reduce efficiency. Hence, this invention, i.e., the vertical axis windmill with wind guiding device, includes vertical plates which are fixed from the bottom of a base structure to the top of a rotor in an annular array. In between any two vertical plates, inclined plates are fixed from the bottom of the base structure to the top of the base structure. These plates are tilted towards the concave side of the rotor blades. The vertical and inclined plates are fixed in angular and radial directions so that whenever the wind blows from any direction, it gets compressed and then is diverted towards the wind receiving blades. Also the vertical plates protect the convex side of the rotor blades from wind while diverting the wind towards the wind receiving blades.

3 Claims, 10 Drawing Sheets

Perspective View of Windmill
with Wind Guiding Device

U.S. PATENT DOCUMENTS

| | | | |
|---|---|---|---|
| 4,508,973 A * | 4/1985 | Payne | 290/55 |
| 5,380,149 A * | 1/1995 | Valsamidis | 415/2.1 |
| 6,191,496 B1 | 2/2001 | Elder | |
| 6,841,894 B2 * | 1/2005 | Gomez Gomar | 290/55 |
| 7,094,017 B2 * | 8/2006 | Kurita | 415/4.2 |

FOREIGN PATENT DOCUMENTS

| | | |
|---|---|---|
| FR | 2505939 A1 | 11/1982 |
| JP | 55142978 A | 11/1980 |

* cited by examiner

Figure 1 Bird's Eye View of Windmill with Wind Guiding Device

Figure - 2 Perspective View of Windmill with Wind Guiding Device

Figure - 3   Top View Of Wind Mill
With Wind Guiding Devices

Figure – 4  Wire Mesh Drawing of Base Structure

Figure - 5 Front View of Inclined Plate

Figure - 6 Front View of Vertical Plate

Figure - 7  Rotor Assembly

Figure - 8 Front View Of Rotor Blades

Figure - 9 Gear Box & Generator Set

Figure - 10  Wind Circulation Diagram

VERTICAL AXIS WINDMILL WITH GUIDING DEVICES

CROSS REFERENCE TO RELATED APPLICATION

This is a national stage application being filed under 35 U.S.C. §371 based on International Application No. PCT/IN2006/000064 filed on Feb. 26, 2006 which in turn takes its priority from Indian Application No. 326/MUM/2005 filed on Mar. 22, 2005.

BACKGROUND OF THE INVENTION

1. Field Of The Invention

The present invention generally relates to the field of windmills, and particularly to vertical axis windmills.

2. Description Of Related Art

Since time immemorial, human civilization has always had a quest for source of energy for an easy and comfortable life, and as a result other sources of energy like windmills were invented. Initially, this windmill was used only in running flourmills and pumping out water. After that, too many conventional energy sources like petroleum fuels were found and all these have been used in a very large quantity. Resultantly, now-a-days all the fuels are on the verge of exhaustion; so again, men are compelled to look towards non-conventional sources of energy and have to improve their techniques.

At present, power generation mostly comes from natural and conventional resources viz, water, coal and petroleum products and due to increased modern human consumption and rising cost of resources, it has created shortfall for the society and the industries. Hence, further improvement has become indispensable for maximum utilization of non-conventional energy sources, which is eco-friendly and economical.

In the last couple of centuries, drastic improvements and innovations took place in power generation through non-conventional energy sources, like solar and wind power across the globe. However, time and again, man is still far from tapping and utilizing wind power as source of energy in the best optimum manner.

Presently, the power generation through wind energy is generated through horizontal and Vertical Axis Windmill, which have their own shortcomings and drawbacks. In horizontal axis windmill the cost of construction is heavy, operation is deterrent and difficult and unable to work at low wind velocity. Whereas the existing Vertical Axis Windmill vibrates on increased height and with high wind velocity, unable to work on low wind velocity and has high risk of instability. Further the harnessing capacity of existing Vertical Axis Windmill is much lower than optimum.

In earlier & present designs of Vertical Axis Windmills, the wind used to strike simultaneously with uniform pressure on inward facing side and outward facing side blades thereby resisting the rotation and hence reducing the efficiency. Coverage area of wind surface is limited to only diameter & height of rotor. Further the wind velocity in present models is utilized as available naturally.

Our instant invention (Wind Guiding Device) converts the wind energy into mechanical energy with the help of its Inclined Plates & Vertical Plates by diverting wind force towards wind receiving Blades of Vertical Axis Windmill, and it utilizes maximum received wind.

BRIEF SUMMARY OF THE INVENTION

Figure 4:
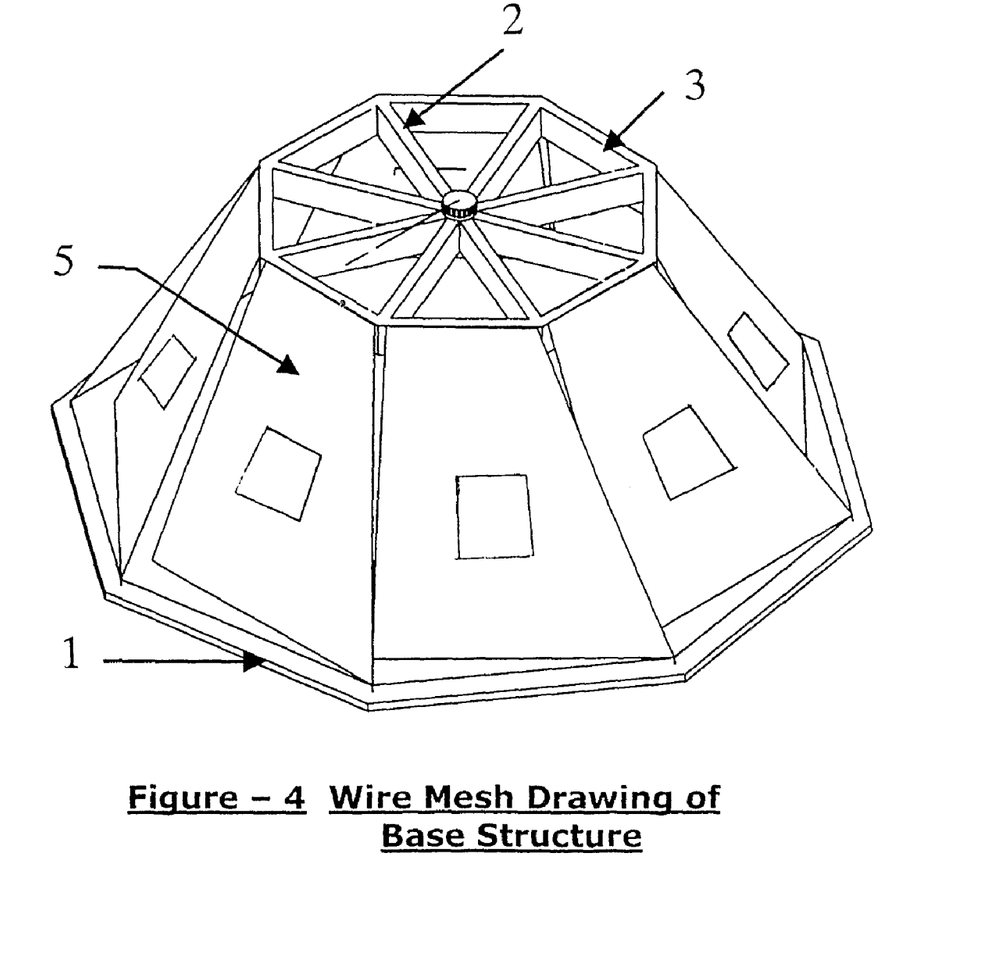
Figure 5:
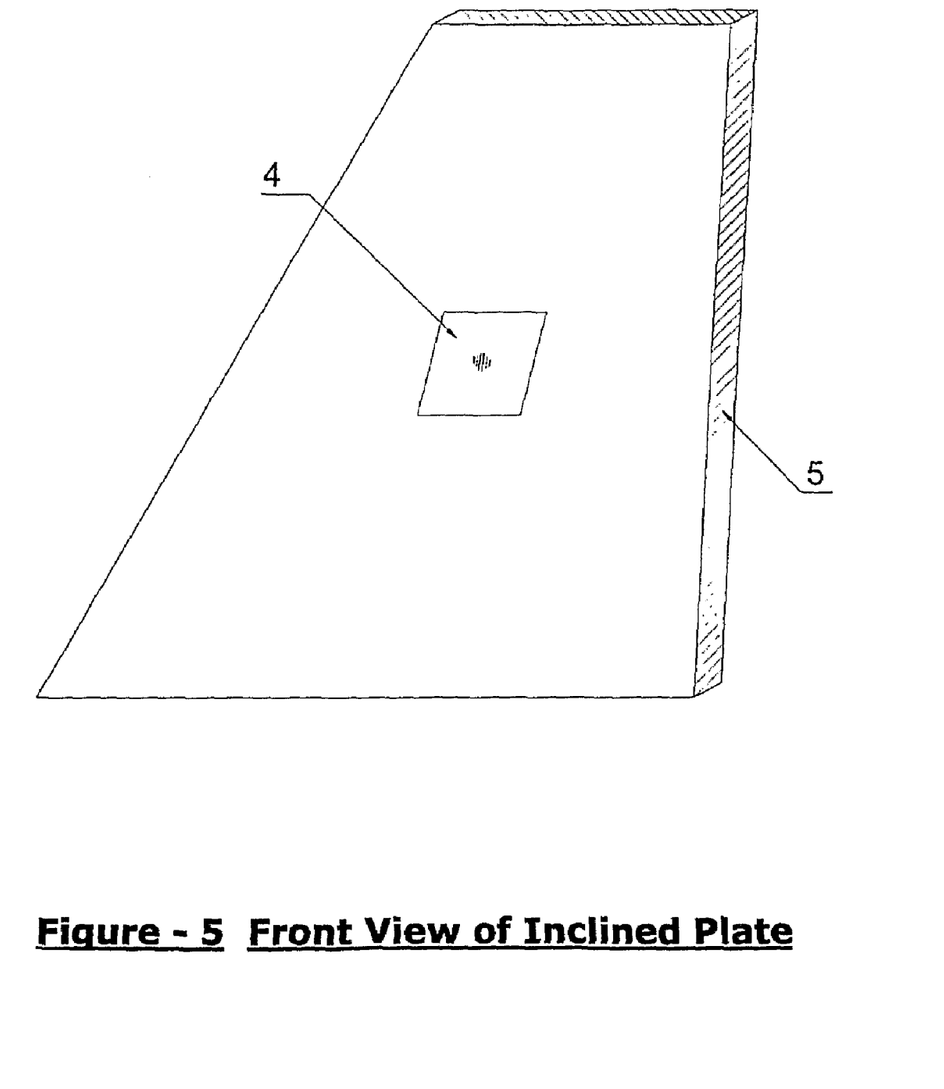
Figure 6:
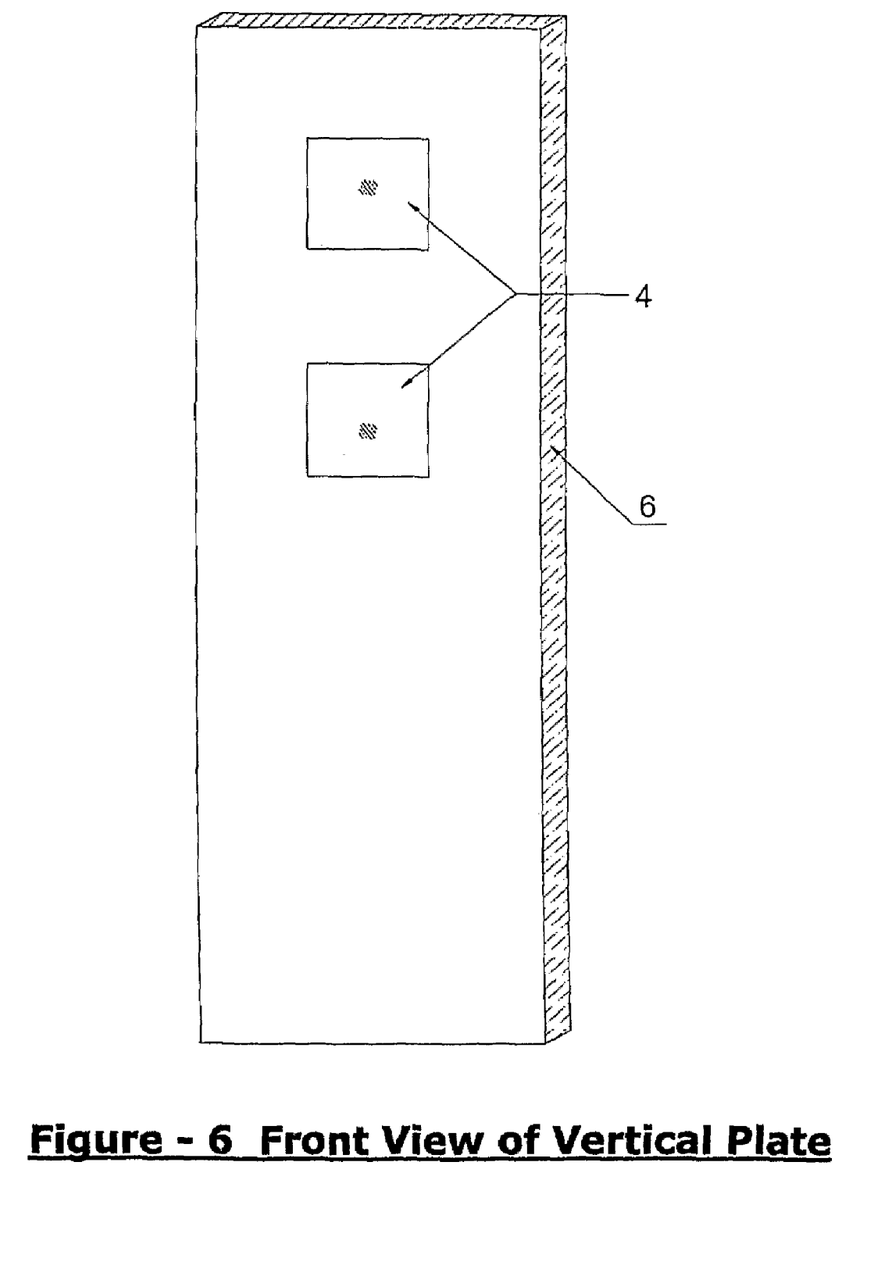

A Vertical axis Wind mill which works by diverted wind force using wind guiding devices comprises of Base platform (1) at its bottom level, Radial Tie Beams (2), Peripheral Tie Beams (3), Base structure (FIG. 4), Inclined plates (angulated & tapering ((5) FIG. 5)), Vertical plates (radially angulated ((6) FIG. 6)), Rotor assembly (with Rotor Blades (7a & 7b) with caps (8), Central Shaft (9), Vertical rotating pipe (10), top & bottom Bearings (11) (FIG. 7)), Gear Box (12), Coupling Systems (13) and Generator (14). The said Inclined plates (5) are fixed between two adjacent Vertical plates (6) from bottom of Base structure to top of Base structure at a particular angle & inclination; the Vertical plates (6) are fixed from bottom of Base structure to top of Rotor at a particular angle & clearance from the Rotor in a radial way. The Rotor Blades (7a & 7b) are section of a hollow cylinder having a Cap (8) at each top & bottom on the concave sides & they are fixed on Vertical rotating pipe (10) which is mounted with top and bottom Bearings on the Central shaft (9). The Rotor assembly rotates around vertical axis. The arrangement of different parts is such as to receive more wind, protect outward facing (convex side) Rotor Blades (7b), divert, compress, and guide the wind only towards wind receiving side (concave side) of Rotor Blades (7a) with help of Inclined plates (5) and Vertical plates (6).

A Vertical axis Wind mill wherein the top edge of each Inclined plate (FIG. 5) is inclined towards inner peripheral tie beams and it is angulated and radiating towards wind receiving side (concave side) of Rotor Blades (7a).

A Vertical axis Wind mill wherein the Inclined plate (FIG. 5) characterized in that the said plate is regular or/and irregular tapered shaped and inclined towards inside radially, extending from bottom level of Base structure to top level Base structure.

A Vertical axis Wind mill wherein the one bottom corner of each Inclined plate is shifted towards inside along edge of vertical plate, so as to create tilt angle with respect to bottom edge and side edge.

A Vertical axis Wind mill where in each Vertical plate (FIG. 6) is angulated and radiating on periphery of rotor; each Vertical plate is angled towards wind receiving side (concave side) of rotor blade (7a) and its' angle will vary as per design specification.

A Vertical axis Wind mill wherein the Vertical plate (FIG. 5) characterized in that the said plate is regular or/and irregular rectangle shaped and radially angulated towards wind receiving side (concave side) of rotor blade (7a), extending from bottom level of Base structure to top of rotor.

A Vertical axis Wind mill wherein between every two Vertical plates, one Inclined plate is provided which creates a shape and dimension that is inclined and angled towards wind receiving side (concave side) of Rotor Blade (7a).

A Vertical axis Wind mill where in the Rotor is surrounded with Inclined and Vertical plates on its entire periphery, the said plates are mounted with or without inbuilt Windows (4) having spring tension shutter (FIGS. 5 & 6).

Figure 8:
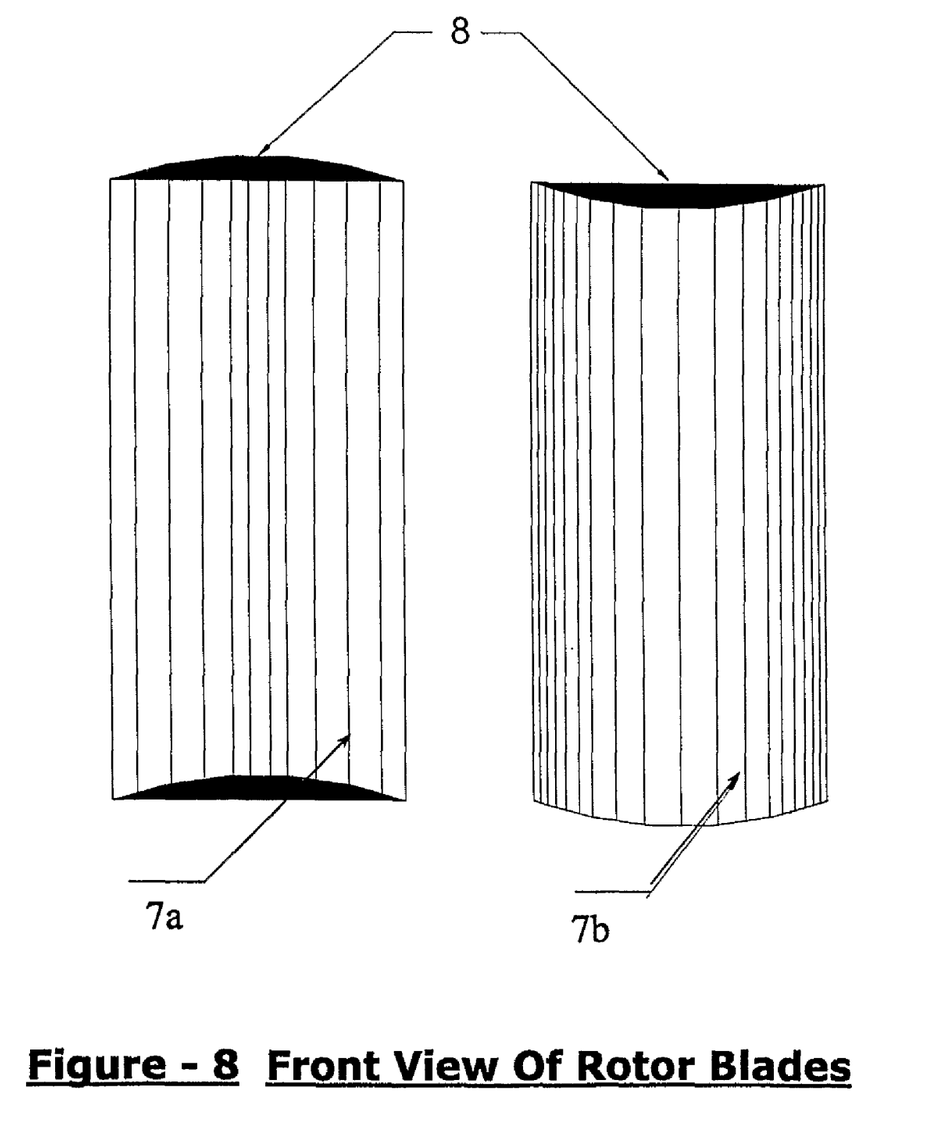

A Vertical axis Wind mill wherein the Rotor Blades which is a section of hollow cylinder, one side is Inward facing (Concave surface (7a)) and the other side is Outward facing (Convex surface (7b)), having a Cap (8) at each top and bottom on the concave side (FIG. 8).

A Vertical axis Wind mill wherein shape of the Base structure is any regular or irregular shape polygon, the Base structure's top and bottom polygon are placed at a particular angle.

A Vertical axis Wind mill wherein the Arrangement of Inclined plates (5) and Vertical plates (6) is such as to receive more wind, protect Outward facing of Rotor Blade (7b), divert, compress and guide the wind only towards wind receiving side (concave side) of Rotor Blades (7a).

A Vertical axis Wind mill wherein the direction of movement of Rotor is Clockwise or Counter Clockwise as per design specification of Rotor and angulations of Vertical plates.

A Vertical axis Wind mill with Wind Guiding Devices such as here and illustrated with references to the accompanying drawings. Also, the instant invention (Wing Guiding Devices) will work with water mill to improve efficiency of water mill by guiding the water of river/sea on exactly similar principles. The rotor can be used in both horizontal & vertical axis model water mill to generate power.

BRIEF DESCRIPTION OF SEVERAL VIEWS OF THE DRAWINGS

The study of the description is particularly illuminating when done in conjunction with the Drawings and Images as under:

FIG. 1

It is the computer model (Bird's Eye View Image) showing complete system of Vertical Axis Windmill with Wind Guiding Devices. It shows arrangement of different parts such as Base structure (1), radial tie beams (2), peripheral tie beams (3), Windows with spring tension shutters (4), Inclined Plates ((5) tapering & angulated along periphery of rotor), Vertical Plates ((6) radiating & angulated along periphery of rotor), assembly of Rotor blades (7) with Caps (8), Central Shaft (9), vertical rotating pipe (10), top & bottom Bearings (11).

Besides these other parts are Gear Box (12), Coupling Systems (13) and Generator (14).

FIG. 2

It shows the Three Dimensional Wire Mesh Drawing of Vertical Axis Windmill with Wind Guiding Device with similar arrangements as mentioned in FIG. 1.

FIG. 3

It shows the Top View/Plan of Vertical Axis Windmill with Wind Guiding Device. Different parts labeled are the Base structure (1), radial Tie Beams (2), peripheral Tie Beams (3), Inclined Plates ((5) tapering & angulated along periphery of rotor), Vertical Plates ((6) radiating & angulated along periphery of rotor). These Vertical & Inclined plates having Windows (4) with spring tension shutters, Rotor assembly ((7 to 11) central Shaft with Blades assembly) & movement of Rotor blades.

FIG. 4

It shows the Three Dimensional Wire Mesh Drawing of Base structure of Wind Guiding Device.

FIG. 5

It shows the Front View of Inclined Plates ((5) tapering & angulated along periphery of rotor) having Windows (4) with spring tension shutter.

FIG. 6

It shows the Front View of Vertical Plates ((6) radiating & angulated along periphery of rotor) having Windows (4) with spring tension shutter.

FIG. 7

It shows the Three Dimensional Wire Mesh Figure of Rotor assembly. Rotor Blades (7a & 7b) with caps (8) are mounted with top & bottom bearings (11) on the Central Shaft (9) and Vertical Pipe (10).

FIG. 8

It shows the Front and back View of the Rotor Blade (7a & 7b), which is section of a hollow cylinder, one side is inward facing/concave surface (7a) and other is outward facing/convex surface (7b). Rotor blades are having a Cap (8) at each top & bottom on the concave sides. The cap is a segment of lid/cover of a cylinder.

FIG. 9

It shows arrangement of Gear box (12), coupling system (13) and Generator set (14).

FIG. 10

This diagram shows the concept of wind circulation, which speaks itself for this invention. Here the wind is guided, diverted & compressed by Vertical & Inclined plates to strike only concave side of Rotor Blades with more velocity.

DETAILED DESCRIPTION OF THE INVENTION

Figure 1:
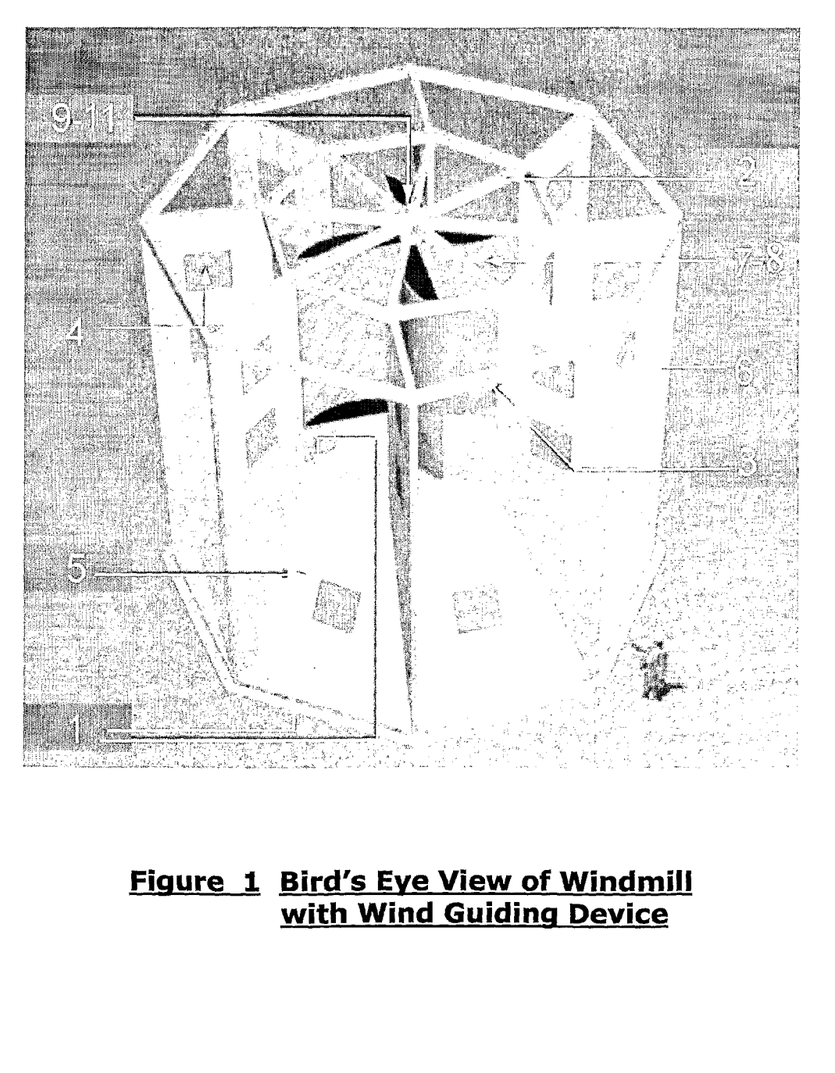

These and other attributes of the instant invention will become clear on thorough examination and study of the description of the best mode of carrying out the invention. The study of the description is particularly illuminating when done in conjunction with the Drawings and Images as under:

FIG. 1

It is the computer Model (Bird's Eye view Image) showing complete structure & system of Vertical Axis Windmill with Wind Guiding Devices. It shows arrangement of different parts such as Base structure (1), radial tie beams (2), peripheral tie beams (3), Windows with spring tension shutters (4), Inclined Plates ((5) tapering & angulated along periphery of rotor), Vertical Plates ((6) radiating & angulated along periphery of rotor), assembly of Rotor blades (7) with Caps (8), Central Shaft (9), vertical rotating pipe (10), top & bottom Bearings (11).

Besides these other parts are Gear Box (12), Coupling Systems (13) and Generator (14). Detailed functions of each part are specified in separate figures given below.

Figure 2:
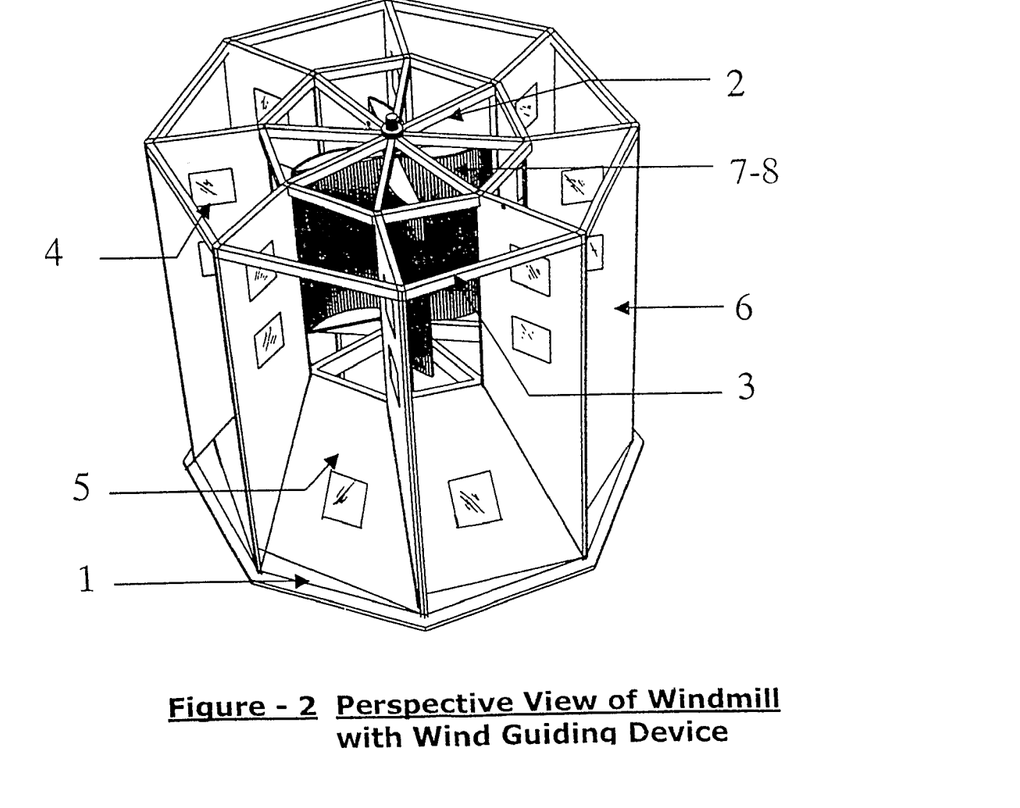

FIG. 2

Figure 7:
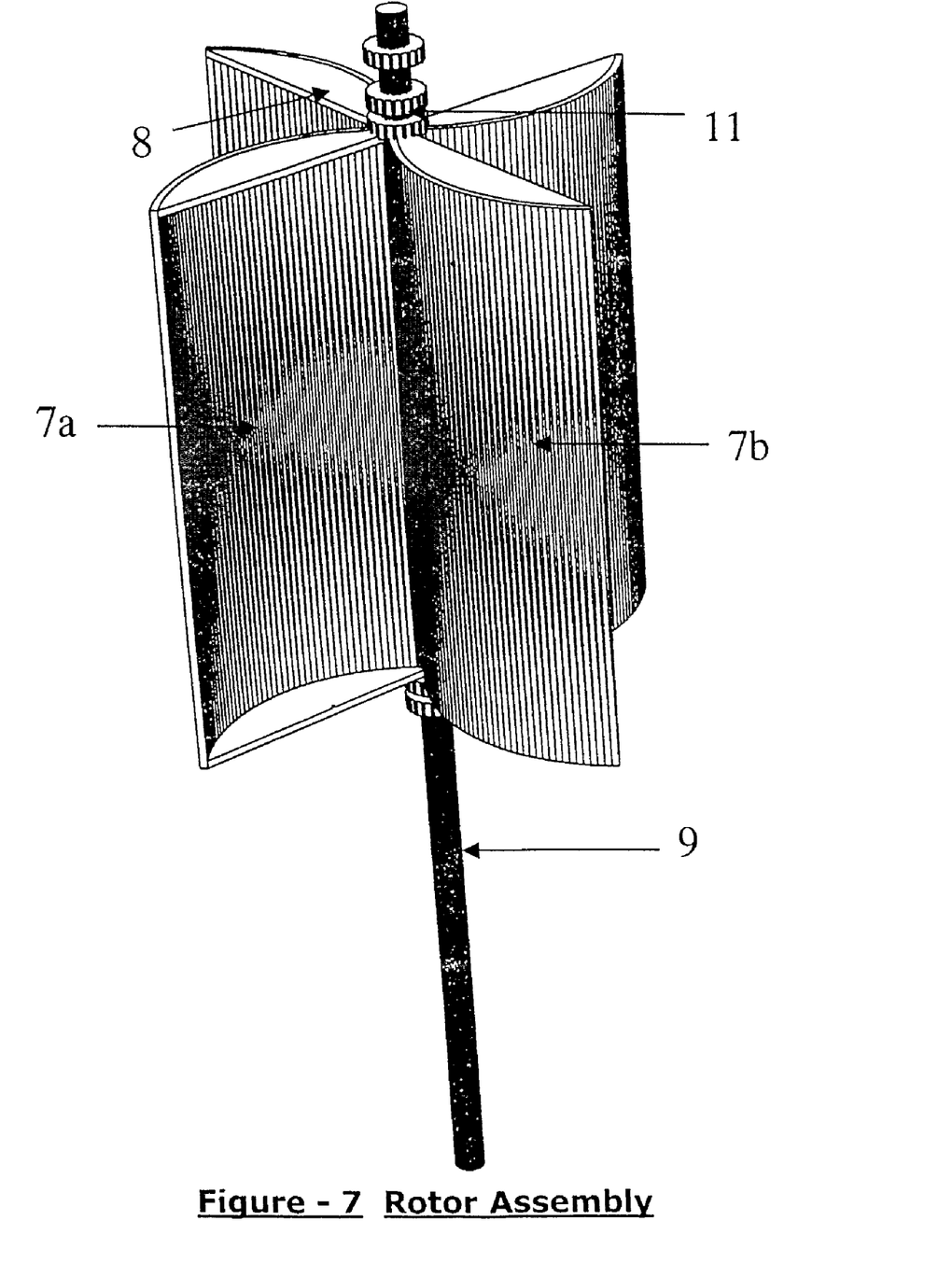

It shows the three dimensional wire mesh figure of Vertical Axis Windmill with wind guiding device. The instant invention is mounted with Inclined Plates ((5) tapering & angulated along periphery of rotor with/without inbuilt Windows (4) having spring tension shutters) (FIG. 5), Inclined Plates are fixed between two adjacent Vertical Plates (FIG. 6) from bottom of Base structure to top of Base structure (FIG. 4), The Vertical Plates ((6) angulated & radiating along periphery of rotor; with/without inbuilt Windows having spring tension shutters) (FIG. 6) are fixed from bottom of Base structure (1) to top of Rotor (FIG. 7) with a radial clearance from the Rotor (FIG. 7). Top edges of Inclined & Vertical Plates are tied up through radial Tie Beams (2) & peripheral Tie Beams (3).

The Base structure ((1) FIG. 4) of Wind Guiding Device comprises of Base platform at its bottom level & Tie Beams (Radial & Periphery) at its top & bottom level. The Shape of Base structure (FIG. 4) can be any regular or irregular shaped polygon. Instant Drawings & Image are for Octagonal polygon in which the Base structure's top & bottom polygons are placed at a particular angle.

The Inclined plate ((5) FIG. 5) is regular or/and irregular tapered shaped & Inclined towards inside radially extending from bottom level of Base structure to top level of Base structure. Each Inclined plate is fixed between two adjacent Vertical Plates (FIG. 6) on entire periphery. One bottom corner of each inclined plate (FIG. 5) is shifted towards inside along edge of Vertical plate (FIG. 6) so as to create a tilt angle with respect to bottom edge & a side edge.

Each Vertical Plate ((6) FIG. 6) is fixed from bottom of Base structure (FIG. 4) to top of rotor (FIG. 7). They are tied up through peripheral & radial Tie Beams on inner & outer edges with Base structure (FIG. 4) and central shaft (9). They are radially angulated equal to the angle difference between inner & outer polygon.

Between every two Vertical Plates (FIG. 6), there is one Inclined plate (FIG. 5), which will create a shape and dimension that is Inclined and angled towards windward side blades. Each Vertical plate (FIG. 6) is also angled towards wind receiving blades ((7a) FIG. 8). Vertical Plate (FIG. 6) are angulated & radiating on periphery of rotor (FIG. 7) and are mounted from bottom of Base structure (FIG. 4) to top of the Rotor.

The Rotor (FIG. 7) is surrounded with Inclined & Vertical Plates on entire periphery. These Vertical & Inclined Plates are mounted with inbuilt Windows (4) having spring tension shutters (FIG. 5, 6).

Figure 3:
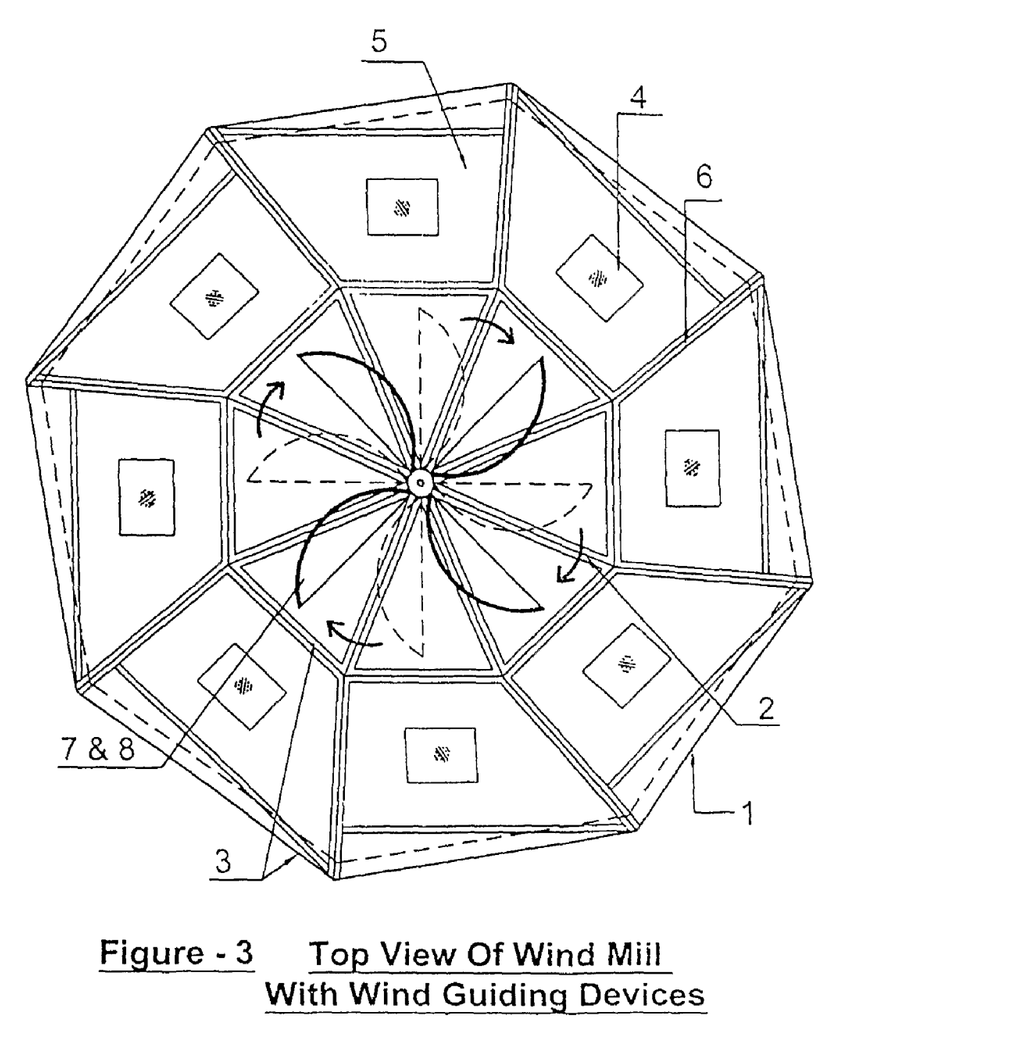

FIG. 3

It shows the Top View/Plan of Vertical Axis Windmill with Wind Guiding Devices. Different parts labeled are the Base structure ((1) FIG. 4), Inclined Plates ((5) tapering & angulated along periphery of rotor) (FIG. 5), Vertical Plates ((6) radiating & angulated along periphery of rotor) (FIG. 6); Plates are having Windows (4) with spring tension shutters, Radial Tie Beams (2) and Peripheral Tie Beams (Inner & Outer) (3), Movement of Rotor blades. Other Details are similar as specified in description of FIG. 2.

FIG. 4

It shows the Three Dimensional Wire Mesh Drawing of Base structure (1) of Wind Guiding Device. Each Inclined plate (FIG. 5) is fixed between two adjacent Vertical Plates (FIG. 6). Top edges of Inclined plates are tied up through radial (2) & peripheral (3) Tie Beams. It comprises of Base platform at its bottom level & Tie Beams (Radial & Periphery) at its top level.

The Shape of Base structure can be any regular or irregular shaped polygon. Instant Drawings & Images are for Octagonal polygon in which the Base structure's top & bottom polygons are placed at particular angle.

FIG. 5

The Inclined plate(s) (5) are regular or/and irregular tapered shaped with window (4) & inclined towards inside radially extending from bottom level of Base structure to top level of Base structure (FIG. 4). They are fixed between two adjacent Vertical Plates (FIG. 6) on entire periphery.

One bottom corner of each Inclined plate is shifted towards inside along edge of Vertical plate so as to create a tilt angle with respect to bottom edge & a side edge.

It is Inclined plate (tapering & angulated along periphery of rotor), which is inclined towards wind receiving side (concave side) of rotor blade ((7a) FIG. 8). It is mounted in annular array (around the rotor). It is from base to top edge of Base structure (FIG. 4). The top edge of Inclined plate is inclined towards inner peripheral beams and it is angulated and radiating towards wind receiving side (concave side) of rotor blade ((7a) FIG. 8).

FIG. 6

The Vertical Plate(s) (6) with window (4) are mounted in annular array from bottom of Base structure to top of rotor (FIG. 7). They are tied up through peripheral & radial Tie Beams on inner & outer edges with Base structure. They are radially angulated equal to the angle difference between inner & outer polygon.

The Vertical Plates are angulated & radiating along periphery of rotor (FIG. 7). It is radially angulated towards wind receiving side (concave side) of rotor blade ((7a) FIG. 8) and which will vary as per design specifications.

FIG. 7

It shows the Three Dimensional Wire Mesh Drawing of Rotor assembly. The Blades ((7a & 7b) FIG. 8) are section of a hollow cylinder fixed around Vertical Pipe (10). They are mounted with top & bottom bearings (11) on the Central Shaft (9) and are able to rotate vertically. Front side of each blade (FIG. 8) has concave shape (inward face (7a)) and the backside has convex shape (outward face (7b)) with caps (8) at top & bottom.

FIG. 8

It shows the Front and back View of the Rotor Blade; which is section of a hollow cylinder, one side is inward facing/concave surface (7a) and the other side is outward facing/convex surface (7b). Rotor blades are having a Cap (8) at each top & bottom on the concave sides, The cap is a segment of lid/cover of a cylinder.

Figure 9:
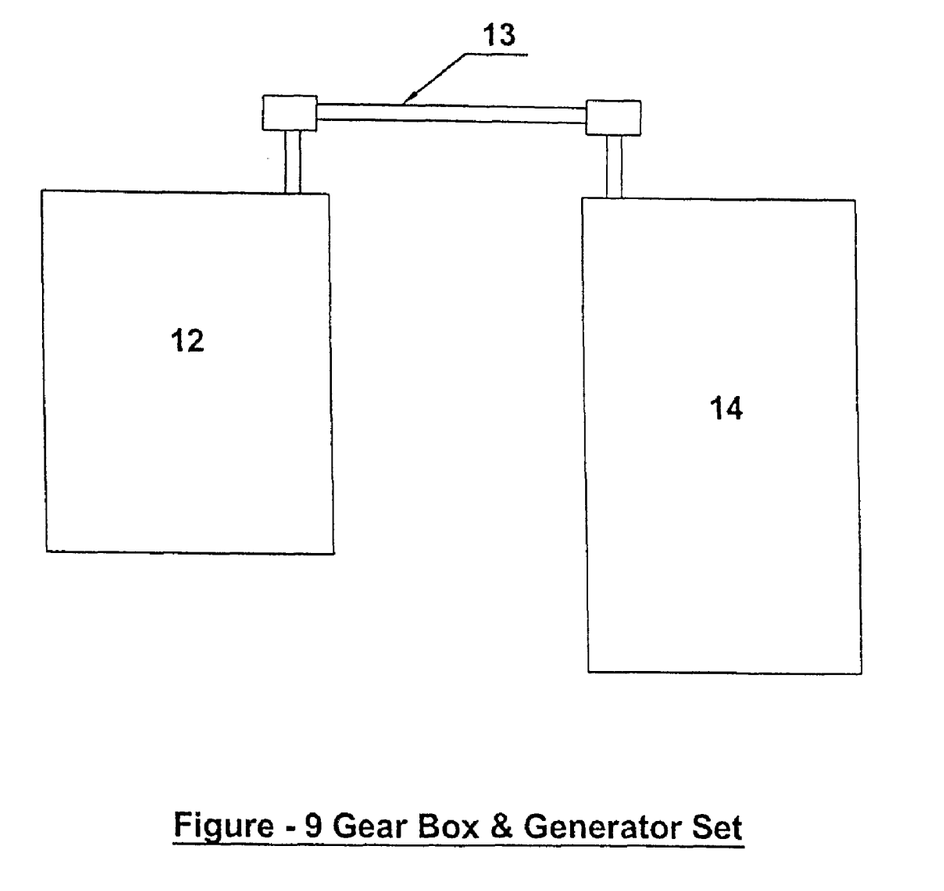

FIG. 9

It shows arrangement of Gear box (12), Coupling system (13) and Generator set (14) which are coupled for converting mechanical energy into Electrical energy, (or store it in a potential form by weight lifting method).

Figure 10:
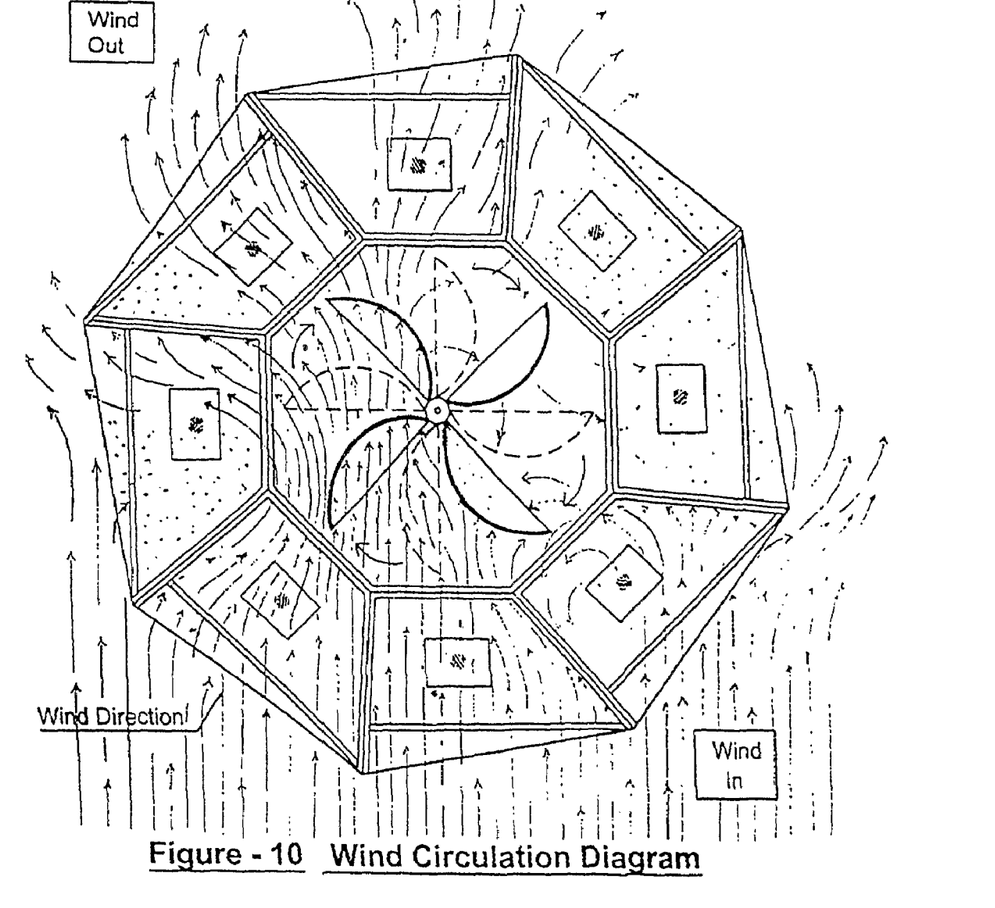

FIG. 10

This diagram shows the concept of wind circulation, which speaks itself for this invention. Here the wind is guided, diverted & compressed by Vertical Plates (FIG. 6) and Inclined Plates (FIG. 5) to strike only concave side of Blades with much more velocity.

Method of Operation

The Theme, Design & Concept of instant invention works with Inclined Plates ((5) tapering & angulated along periphery of rotor) (FIG. 5) and the Vertical Plates ((6) radiating & angulated along periphery of rotor) (FIG. 6). Each Inclined Plates (FIG. 5) are fixed between two adjacent Vertical Plates (FIG. 6). Both the Vertical & Inclined Plates are oriented at such an angle that wind gets diverted, compressed and guided towards concave surface of the rotor Blades (wind receiving blade ((7a) FIG. 8)). Top edges of Inclined & Vertical Plates are tied up through peripheral & radial Tie Beams.

Inclined Plates ((5) FIG. 5) receive wind from bottom to top of Base structure (FIG. 4) and diverts wind toward windward side (concave surface) of rotor blades ((7a) FIG. 8). Further the wind gets compressed (inside two Vertical Plates) when it strikes towards Inclined & Vertical Plates simultaneously.

When the wind blows from any direction it will strike Inclined and Vertical Plates simultaneously before reaching the Rotor assembly (FIG. 7). The Inclined Plates (FIG. 5) will divert & guide wind from bottom to upwards radially towards concave surface of rotor Blades (wind receiving blades) ((7a) FIG. 8), while the Vertical Plates (FIG. 6) will divert, compress & guide wind circumferentially & radially towards concave surface of rotor Blades (wind receiving blades) ((7a) FIG. 8) and induce orbital-cum-tangential velocity, thereby increasing the rotations tremendously. Further, the top & bottom caps of rotor blades ((8) FIG. 8) will restrict the movement of the wind upwards and downwards after striking the rotor blades; which increases the wind pressure hence increasing the rotations considerably.

In instant invention, the wind with the help of Vertical Plates (radiating & angulated along periphery of rotor) ((6) FIG. 6) & Inclined Plates (tapering & angulated along periphery of rotor) ((5) FIG. 5) will be tangentially diverted & will focus only on the windward side concave surface of rotor Blades (wind receiving blades) ((7a) FIG. 8); thus giving it more strength to rotate faster in clockwise or anticlockwise direction as per the arrangement of plates & Rotor blades. This system will not permit rotation of Blades in an opposite direction other than designed for in any given condition.

Between every two Vertical Plates ((6) FIG. 6), there is one Inclined plate ((5) FIG. 5), which will create a shape and dimension that will divert, compress and guide wind only towards wind receiving side (concave side) blades ((7a) FIG. 8). At the same time the radially angulated Vertical Plates ((6) FIG. 6) protects convex surface (outward facing) side rotor blades ((7b) FIG. 8) from striking wind in opposite direction and the same wind diverts towards windward facing blade (wind receiving blades) ((7a) FIG. 8).

Instant invention is most useful at low wind power; it receives more wind and increases velocity by diverting, compressing & guiding the wind through Vertical & Inclined plates. Also it utilizes wind blowing on it from any direction and converts wind energy into mechanical energy, which is further converted into Electrical energy (or store it in a potential form by weight lifting method).

In case of higher than maximum permissible wind velocity, the built-in windows with spring tension shutters (4) fixed on inclined and vertical plates (FIGS. 5-6) will open and allow the excess wind to bypass and maintain r.p.m. (rotations per minute) of the rotor as per the design parameters.

Further, Wind blows on wind guiding device and creates low pressure on other side (leeward side) of Wind Guiding Device which further helps rotor to rotate smoothly (FIG. 10).

Also, the compressed wind on the concave side of Blades and uncompressed wind on the convex side will create pressure difference and induce more rotations (FIG. 10).

Normal Vertical windmill receives wind to the extent of the size of the Rotor assembly, whereas the instant structure & system of invention extends the area of operation of Rotor assembly depending upon length, breadth & height of Inclined & Vertical Plates (placed in circumferential array around the rotor) which is equipped to receive and divert the surplus wind towards Rotor assembly.

Hence this system with Plates will optimize the rotation of Blades and efficiency of windmill. Even a breeze of normal blowing wind will be utilized to generate energy.

The gear box (12), coupling system (13) and Generator set (14) (FIG. 9) are installed inside of base structure to convert mechanical energy into Electrical energy, (or store it in a potential form by weight lifting method).

This instant invention will prove to be a boon for the human civilization, industries, and economy and in particular energy sector across the globe, as it is economical, having long-term life & low maintenance and has wide areas of application. The instant invention is an outcome of our continuous research, study, experiments, dedication, foresight and sacrifice.

I claim:

1. A vertical axis wind mill with wind guiding device which works by diverted wind force comprises a base structure, inclined plates, vertical plates, a rotor assembly that includes rotor blades, a central shaft, top and bottom bearings; radial tie beams, peripheral tie beams, a gear box, a coupling system and a generator;

wherein said base structure, as a whole, is being surrounded peripherally by said inclined plates to form a polygonal shape and which comprises a base platform at a bottom level of said vertical axis wind mill;

wherein said radial tie beams are extended radially, above a top portion of said base structure as well as above a top portion of said rotor assembly so as to have a center on said central shaft and wherein said peripheral tie beams are extended peripherally to that of said radial tie beams;

wherein each of said inclined plates tapers from bottom to top and is angulated along a periphery of said base structure such that the inclined edges of said inclined plates are tied up through said radial tie beams and peripheral tie beams of the base structure;

wherein said rotor assembly comprises a plurality of rotor blades and wherein each of said rotor blades comprises a section of a hollow cylinder with top and bottom caps and wherein a convex side of said section of said hollow cylinder forms a wind receiving side of each rotor blade and wherein said caps restrict the movement of wind upwards and downwards after striking the rotor blades and thereby increase the wind pressure to increase the rotations of said rotor assembly considerably; and wherein said gearbox is coupled to said central shaft and to the generator.

2. The vertical axis wind mill as claimed in claim 1, wherein top portion of each of said vertical plates is smaller than bottom portion and wherein two adjacent inner and outer top edges of each two upper sides of the said vertical plates are tied up through said peripheral tie beams.

3. The vertical axis wind mill as claimed in claim 1, wherein one bottom corner of each of said inclined plates is shifted inward along the bottom edge of the each of the vertical plates, so as to create a tilt angle with respect to bottom edge and side edge of each of the vertical plates.

* * * * *